(12) United States Patent
Biziorek et al.

(10) Patent No.: US 7,198,295 B2
(45) Date of Patent: Apr. 3, 2007

(54) RETAINER ARRANGEMENT CONNECTING OPERATING UNIT TO A VEHICLE

(75) Inventors: Stephane Biziorek, Champlitte (FR); Lionel Guiet, Gray (FR)

(73) Assignee: Deere & Company, Moline, IL (US)

( * ) Notice: Subject to any disclaimer, the term of this patent is extended or adjusted under 35 U.S.C. 154(b) by 422 days.

(21) Appl. No.: 10/721,969

(22) Filed: Nov. 24, 2003

(65) Prior Publication Data

US 2004/0104546 A1 Jun. 3, 2004

(30) Foreign Application Priority Data

Nov. 26, 2002 (DE) ................ 102 54 953

(51) Int. Cl.
*A01B 61/02* (2006.01)
(52) U.S. Cl. .............. 280/762; 172/6; 172/38; 172/235
(58) Field of Classification Search ............. 56/10.4, 56/15.7, 15.3; 172/233, 234, 235, 6, 5, 38
See application file for complete search history.

(56) References Cited

U.S. PATENT DOCUMENTS

| | | | | |
|---|---|---|---|---|
| 3,543,489 A | * | 12/1970 | Kasberger et al. ........... 56/10.4 |
| 4,037,395 A | * | 7/1977 | Henkensiefken et al. ..... 56/218 |
| 4,304,087 A | * | 12/1981 | Zweegers ................... 56/10.4 |
| 4,384,618 A | * | 5/1983 | Williams ........................ 172/5 |
| 4,491,183 A | * | 1/1985 | Anderson et al. .............. 172/5 |
| 4,495,754 A | * | 1/1985 | Cartner ......................... 56/11.9 |
| 4,506,464 A | * | 3/1985 | Cartner .......................... 37/91 |
| 4,518,043 A | * | 5/1985 | Anderson et al. .............. 172/6 |
| 5,566,537 A | * | 10/1996 | Kieffer et al. ............... 56/15.2 |
| 5,733,059 A | * | 3/1998 | Anderson ..................... 403/31 |

FOREIGN PATENT DOCUMENTS

| | | |
|---|---|---|
| CH | A5-674 440 | 6/1990 |
| DE | A-749 281 | 11/1944 |
| DE | 36 01 465 A | 1/1987 |
| DE | 90 07 819 U | 2/1997 |
| EP | 0 487 968 A | 6/1992 |
| FR | 86 925 E | 3/1966 |
| JP | 2002 061141 A | 2/2002 |

* cited by examiner

*Primary Examiner*—Jeff Restifo

(57) ABSTRACT

A retaining arrangement, including a support arm is proposed, by means of which an operating unit is connected with a vehicle. The retaining arrangement includes a safety device which operates such that, as long as a predetermined condition is not fulfilled, the connection of the operating unit with the vehicle is maintained. The operating unit is connected with the support arm in such a way that the operating unit can pivot with respect to the support arm about at least one axis provided with at least one vertical component that is arranged in a generally central region of the operating unit, when the safety device frees the connection.

7 Claims, 6 Drawing Sheets

RETAINER ARRANGEMENT CONNECTING OPERATING UNIT TO A VEHICLE

FIELD OF THE INVENTION

The invention concerns a retainer arrangement with a support arm to connect an operating unit with a vehicle and at least one safety device that limits the movement of the operating unit, as long as a predetermined condition is not fulfilled, as well as an operating implement with such a retaining arrangement and a vehicle.

BACKGROUND OF THE INVENTION

DE-A-749 281 shows a cutter head that is retained on a tractor by means of a latching arrangement that releases upon an impact with an obstacle, in that it unlatches. The cutter head then pivots in the horizontal direction about a vertical journal to the rear.

CH-A5-674 440 shows an arrangement for fastening a cutter head to a vehicle. This arrangement is provided with a hinged joint that includes a shear pin. This shear pin can shear off upon impact of the cutter head with an obstacle, whereupon the cutter head can pivot to the rear about a vertical axis.

The problem underlying the invention is seen in the fact that retaining arrangements of this type permit an evasion of the operating unit only to the rear and therefore are not appropriate for an operating unit arranged in a side region of a vehicle, particularly since in such a movement, a relatively large space must be covered and collisions with further obstacles or with wheels of a vehicle of a corresponding configuration can occur.

SUMMARY OF THE INVENTION

According to the present invention, there is provided a novel retaining arrangement for securing an operating unit to a support arm.

An object of the invention is to provide a retaining arrangement for an operating unit that is constructed with a safety device such that the operating unit may move about an axis to a released position, so as to avoid an obstacle without requiring a large amount of space.

This object is accomplished by a retaining arrangement having a safety device constructed such that the axis about which the released operating unit moves is provided at least with a vertical component, that is, it can be oriented in an inclined direction as well as vertically. The operating unit with its side regions can pivot upon an impact with an obstacle not only to the rear but also forward as well as to the rear. To execute such a movement, the operating unit requires relatively little free space, whereby the danger of a collision with other components, such as, for example, the wheels of a carrier vehicle or another obstacle, is reduced.

The safety device can secure the operating unit in a positive lock and/or friction locking arrangement against pivoting that can be released. A positive lock can be provided, for example, by one or more shear elements, for example, in the form of a shear pin. However, the use of one or more latching mechanisms is also conceivable. Such latching mechanisms can be loaded, for example, by one or more springs or similar devices. A predetermined maximum load applied to the attached unit can be determined by a shear element as well as by a preset load on a latching mechanism. If this load is exceeded, then the shear element shears off or the force applied by the latching mechanism is released, so that the operating unit is freed. It is also conceivable that such a latching mechanism or another retaining mechanism, for example, in the form of a movable safety pin or the like be loaded or actuated electrically or mechanically, so that an actuation can be performed as a function of a proximity switch or a contact switch or element (see below). A positive lock can be provided, for example, by friction elements that permit a movement of the operating unit when a predetermined force on the operating unit is exceeded. An electromagnet could also be provided that locks the operating unit in its activated condition and releases it in its deactivated condition. Such an electromagnet may be activated or deactivated, for example, by the signal of an optical, a mechanical or other proximity or contact switch.

If this condition is a load, then it can be selected in such a way as to assure that it cannot lead to any damage of the operating unit or other components interacting with it. If it is a spacing that is not to be reached, then the operating unit can be released in advance of an actual contact or a collision with an obstacle and thereby protected from an increased load.

The retainer arrangement engages the operating unit in such a way that the operating unit can rotate after its release by the safety device. Beyond that, provision can be made for the retainer arrangement to engage the operating unit, so as to be released easily from the retainer arrangement or the support arm, for example, upon a frontal impact or in the case a further load is exceeded, or the like.

The operating unit can also engage the retainer arrangement in a sliding direction, so that in addition to a rotational movement, a translational movement is made possible with an increased region of escape for the operating unit.

A sliding engagement of the operating unit, by means of the retainer arrangement, can be attained by the provision of a slot, in which a journal is guided in such a way that it cannot escape from the slot in an axial direction. The slot can be provided on the operating unit or directly or indirectly on the support arm. If the slot is open at one end, then a connection is made possible that can be released if the pin can escape from the slot upon an overload or a frontal impact with an obstacle.

An axial retention of the pin in the slot can be attained easily by the provision of an enlarged head region for the pin that exceeds the width of the slot or that is provided with a safety device configured in this way. In such a way, the pin is guided in the slot as if retained by rails.

Provision can be made that the operating unit can pivot about an at least generally horizontal axis. In this way, the operating unit can follow the contour of the ground.

If the support arm is configured as a two-piece assembly, then the axis with at least one vertical component can be formed by the pivot axis of the hinge connecting the two parts. Here, the safety device can preferably prevent pivoting of the hinge. For this purpose, the safety device can be configured as a shear pin. Other configurations or forms are equally possible (see above configurations).

Such a retaining arrangement can form an operating implement with such an operating unit, where the operating unit can be connected to a vehicle over the retaining arrangement or the support arm. The operating unit may be, for example, a cutter head, such as a sickle cutter or a spindle cutter, a mulching implement, a conditioning tedder, a crimping tedder, a mower or conditioning tedder or even a cutter bar. Other implements, such as agricultural implements, particularly towed or pushed agricultural implements or implements for lawn, garden or estate care are conceivable. The vehicle may be a tractor, a forage harvester, a tracked vehicle or any other appropriate carrier vehicle.

The operating implement may be equipped with a proximity sensor or a contact sensor, that interacts with the safety device in such a way that the safety device frees the operating implement when a contact with an obstruction or the proximity of an obstruction is detected by the sensor. Such a sensor may be a mechanical sensor, an inductive or optical sensor, a radar sensor or any other appropriate sensor. Instead of, or in addition to freeing the operating unit, the sensor may prevent an operation of the operating unit as a function of the condition, in order, for example, to avoid any damage to operating devices, such as mower knives or the like, or any damage to the ground by these operating devices when the operating unit meets with an obstacle and evades it. Alternatively, or in addition, provision may also be made for the sensor to activate a warning arrangement, for example, an optical indicator or an acoustic signaling arrangement, if an obstacle is approached or the operating unit collides with it.

Vehicles may be equipped with such an operating implement or with several operating implements. The vehicle may, in particular, be an agricultural utility vehicle or mowing implement or an implement for lawn, garden or estate care.

A configuration according to the invention is particularly appropriate if the operating implement is arranged in a side region of the vehicle, since such an implement may collide frontally as well as on the side with an obstacle, and the danger of a collision with the wheels of the vehicle is reduced.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
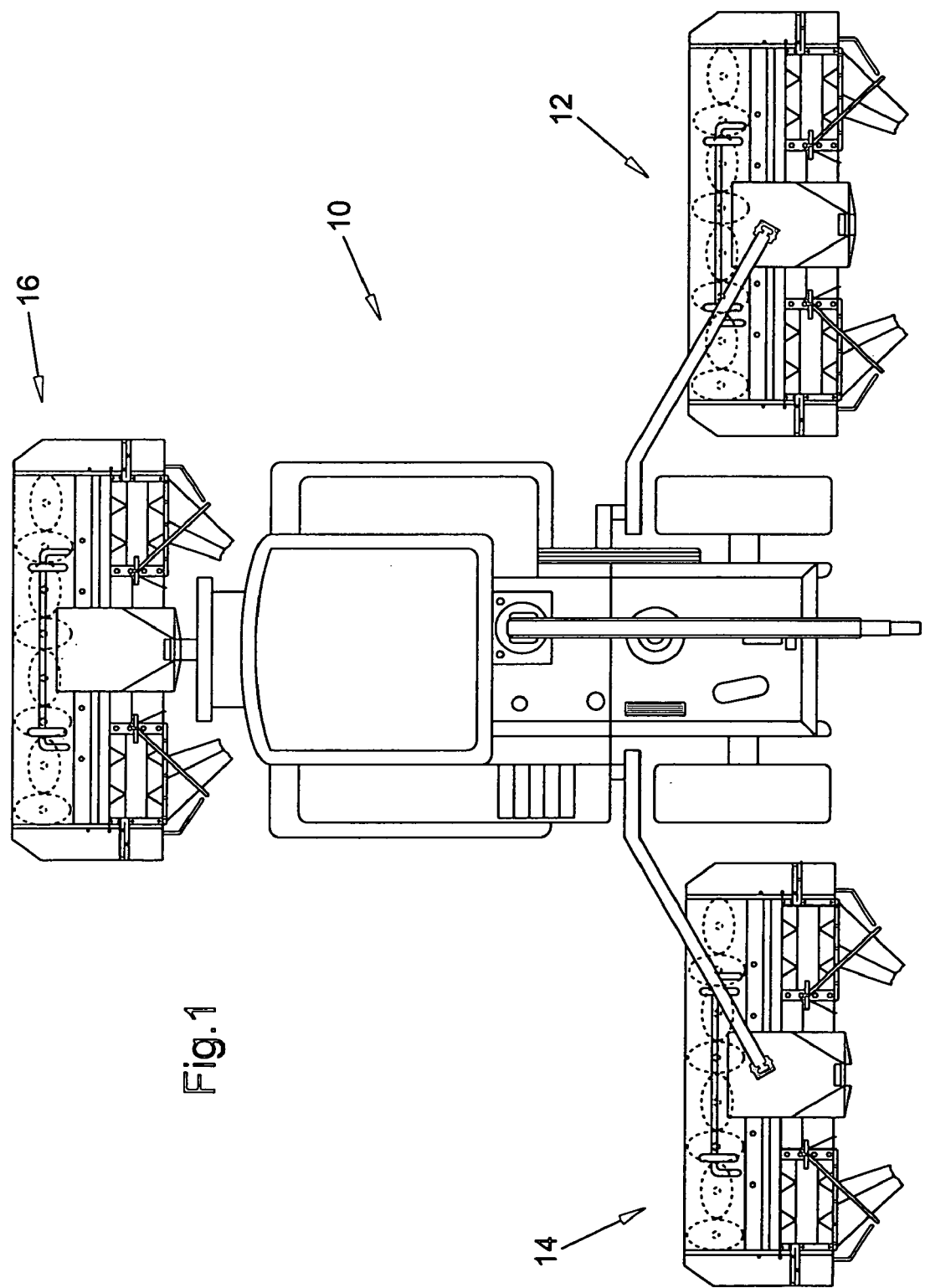
FIG. 1 is a schematic plan view of a vehicle to which three operating implements are attached.

In the following, reference is made at first to FIG. 1, which shows a vehicle 10 to which three operating implements 12, 14, 16 are attached.

The vehicle 10 is a self-propelled harvesting vehicle in the form of a forage harvester, as it is generally known. The application of other vehicles, however, can be considered such as, for example, tractors etc, that offer the possibility of the attachment of operating implements.

Two of the operating implements 12, 14 attached to the vehicle 10 are provided at the sides, and a third operating implement 16 is provided in the front region of the vehicle 10. The operating implements 12, 14, and 16 may be cutter heads, conditioning tedders, crimping tedders, mower or conditioning tedders or a mower beam or cutter bar. Other agricultural implements, for example, for ground breaking operations or for lawn, garden or estate care are conceivable.

Figure 2:
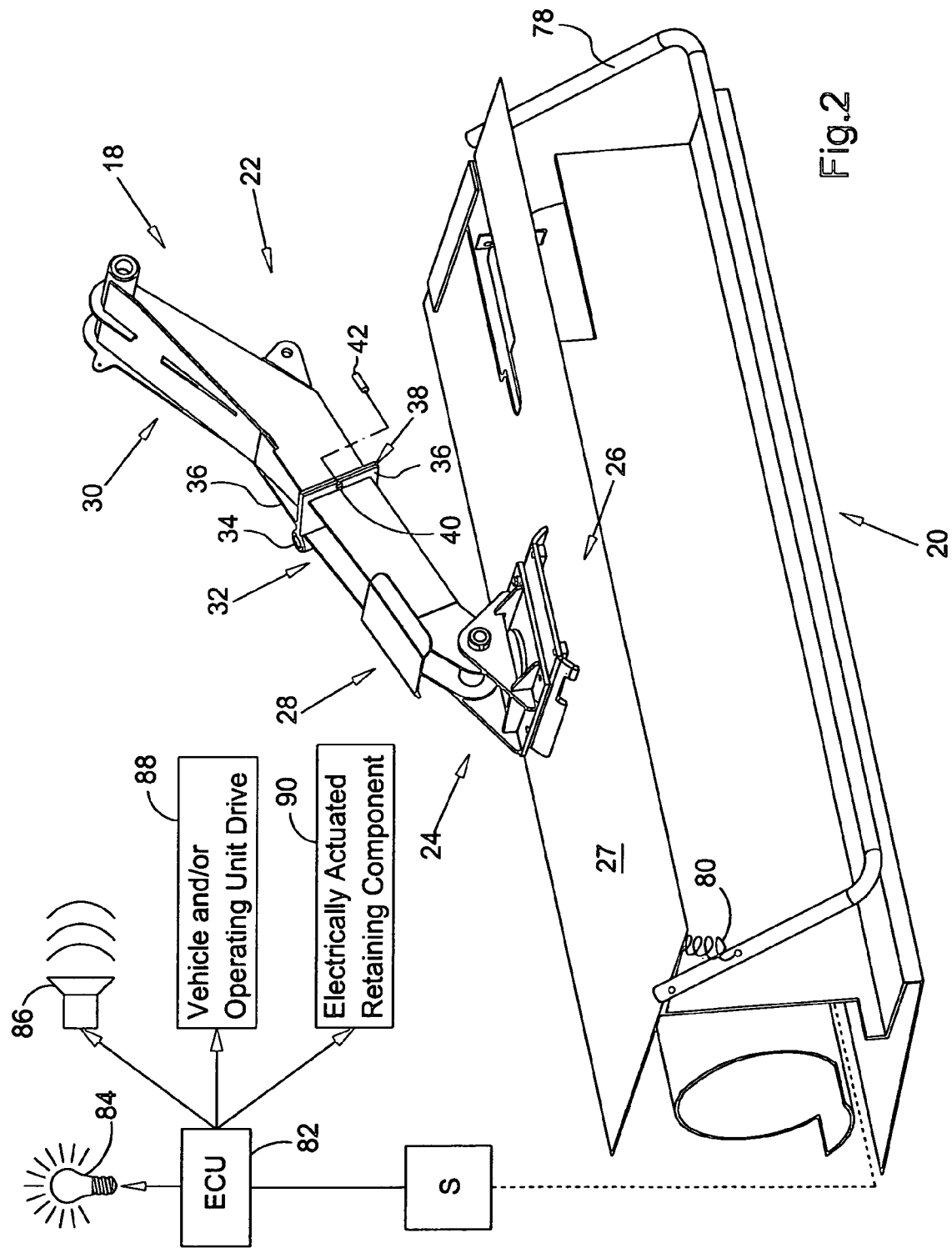
FIG. 2 is a perspective view of the operating implement on the right side of the vehicle in the usual direction of operation as seen from the front and the right side.

In the following, reference will be made only to the right operating implement 12 as seen in the usual operating direction of the vehicle 10, which is shown in an enlarged view in FIG. 2.

The operating implement 12 is provided with a retaining arrangement 18 as well as an operating unit 20.

The retaining arrangement 18 includes a support arm 22 which engages at one end over a mounting arrangement 24 with a central region 26 of the operating unit 20 and is pivotally connected at its other end to the vehicle 10 in a joint for free vertical movement about a generally horizontal axis that extends in the longitudinal direction of the vehicle 10.

The operating unit 20 in turn is provided with a housing 27 in which operating tools (not shown) are arranged, these tools, for example, being mowing disks, crushing arrangements or the like.

The support arm 22 is configured as a two-piece assembly and is provided with a first part 28 facing the operating unit 20 and a second part 30 facing the vehicle 10. The parts 28 and 30 are connected to each other by means of a hinge 32.

The hinge 32 is provided with a generally vertical pivot axis 34 that is arranged in the rear region of the support arm 22, as considered relative to the forward direction of operation of the vehicle 10, and from which leaves 36 of the hinge 32 extend.

Beyond that, the hinge 32 is configured in such a way that it extends, or the leaves 36 of the hinge extend, beyond the support arm 22 at least in a region 38 located opposite the pivot axis 34. In the region 38, the leaves 36 of the hinge 32 are provided with bores 40 aligned with each other. A safety device 42 configured as a pin can be inserted into these bores 40.(for the sake of clarity this safety device is shown in a disassembled condition). Such a safety device 42 is usually provided with a predetermined breaking point which breaks when a predetermined load is reached or is exceeded.

Figure 3:
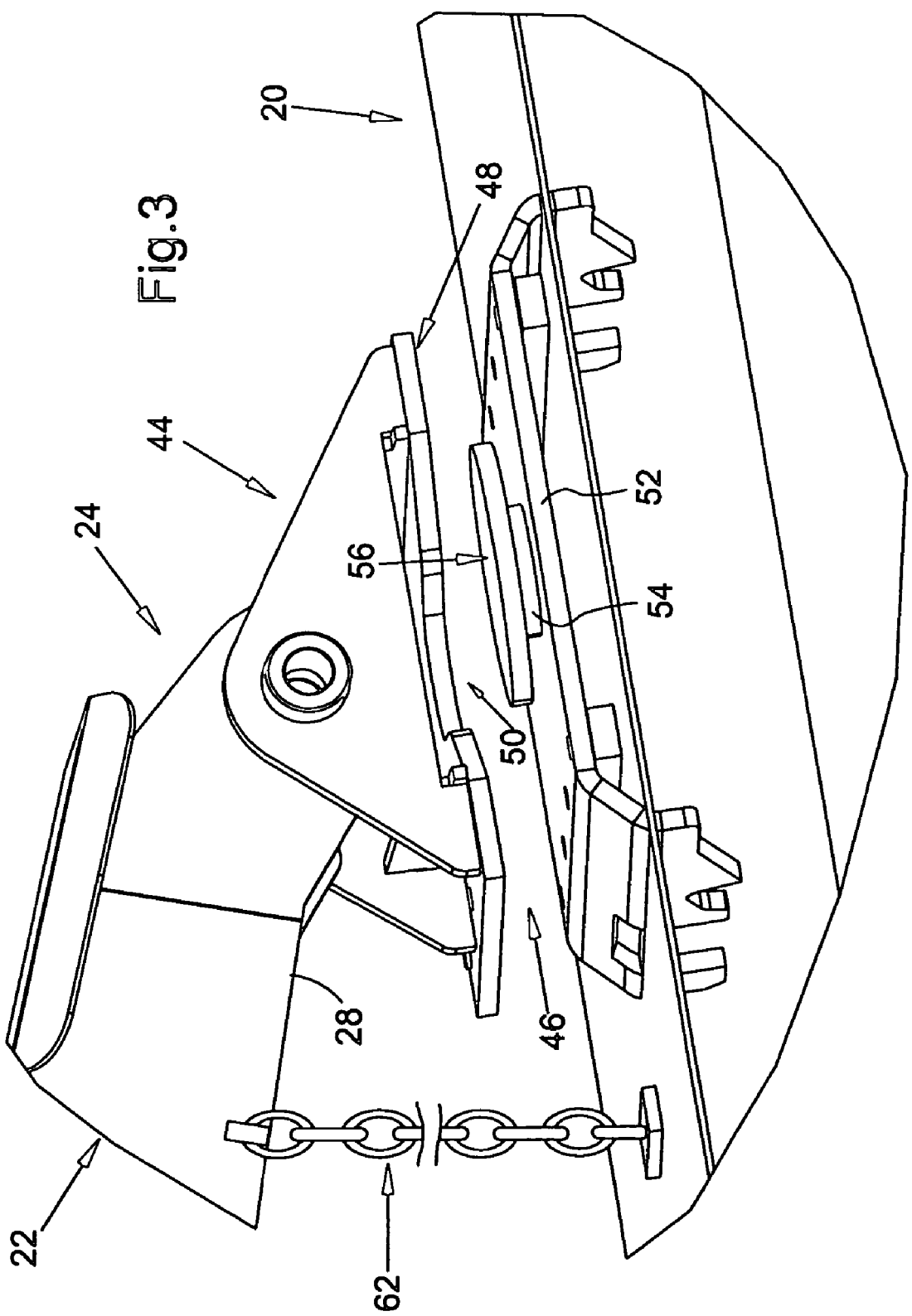
FIG. 3 is an enlarged view of a retaining arrangement and an operating unit of a first or a second embodiment in an unconnected condition.
Figure 4:
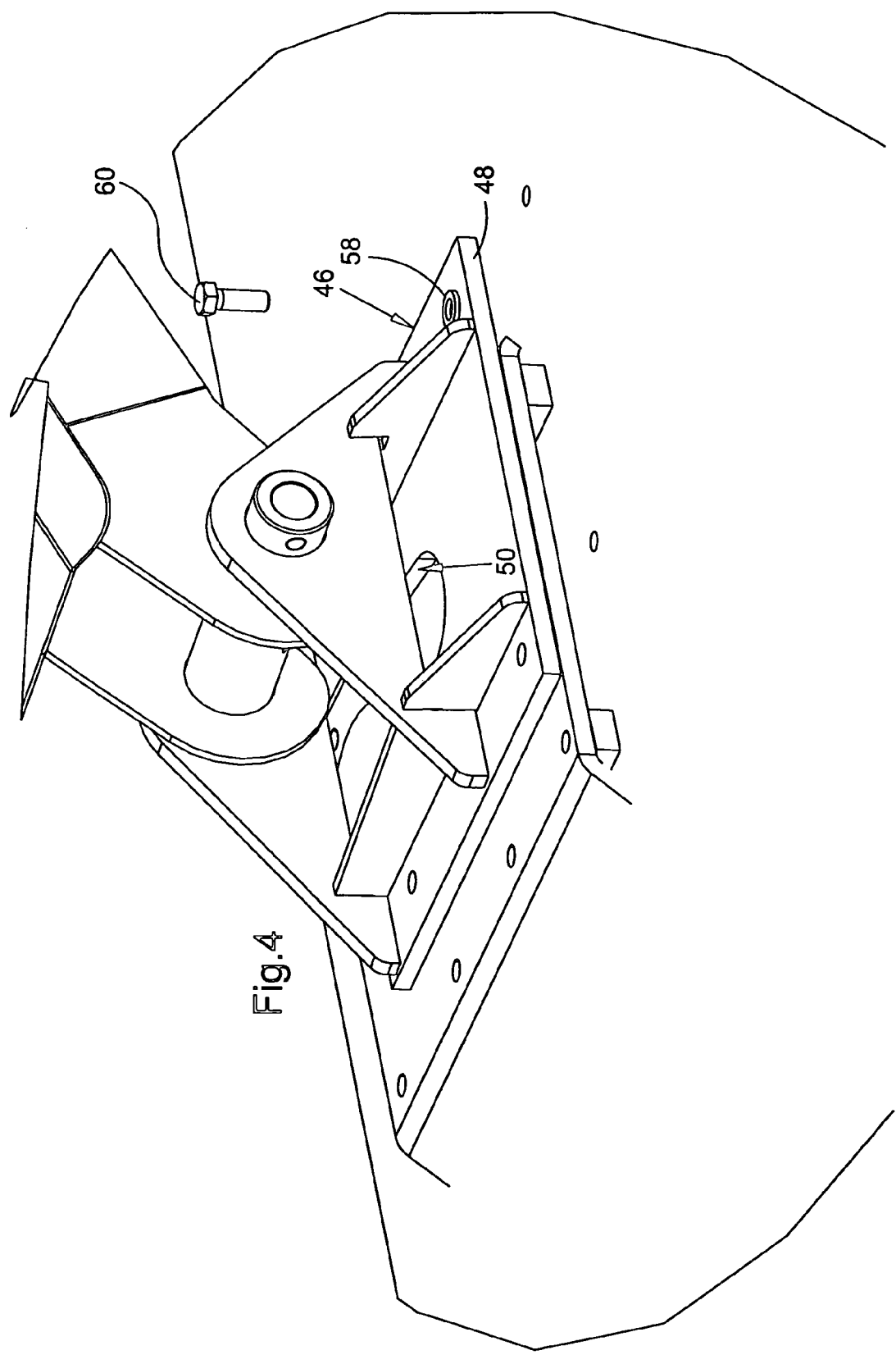
FIG. 4 is an enlarged view of the retaining arrangement and operating unit somewhat like that shown in FIG. 3, but in an assembled condition.

Referring now to FIGS. 3 and 4, there the mounting arrangement 24, which connects the support arm 22 with the operating unit 20 is shown in greater detail. As can best be seen in FIG. 3, the outer part or section 28 of the support arm 22 faces the operating unit 20 and has an end region 44 that is in the form of a claw 46. This claw 46 includes an underside defined by an at least generally planar plate 48 facing the operating unit 20 and provided with a centrally arranged slot 50 that opens in a trailing rear region, relative to forward travel of the vehicle 10, and is closed in a leading forward region.

On the operating unit 20, a console 52 is provided from which a pin 54 extends in the direction of the planar plate 48. An upper end of the pin 54 is defined by an enlarged head 56.

The pin 54 and the head 56 are dimensioned in such a way that the pin 54 can be introduced into the slot 50 and can move freely within the latter, however the size of the head 56 exceeds that of the slot 50 in such a way that the pin 54 cannot leave the slot 50 in the axial direction, but instead is guided in it as on a pair of rails.

FIG. 4 shows the support arm 22 and the console 52 as seen from the opposite side of that shown in FIG. 3. From this figure, it can be seen that a bore 58 is provided at an inner forward corner of the plate 48 of the claw 46. This bore 58 is aligned with a bore, not shown, in the console 52, when the pin 54 is completely introduced into the slot 50, and the claw 46 and the operating unit 20 are oriented correspondingly. During operation, a safety device 60, configured as a shear pin, is inserted into these bores and is designed such that it shears off upon the impact of a predetermined force. For the sake of clarity, the safety device 60 is shown withdrawn from the bore 58.

The following will now describe the method of operation of the retaining arrangement 18 in greater detail.

When the vehicle 10 is operated so that the operating unit 20 is in a position to which it has been lowered that is just barely above the ground and is conducted over the ground by the vehicle 10 operating in its forward direction, the operating unit 20 may possibly collide with an obstacle. Such an obstacle may be a rock, a low fence, a growth of roots or the like, which has not been seen by the operator or the driver of the vehicle 10 and hence was not evaded during the operation. In the case of a rigid attachment of the operating unit 20 to the support arm 22, such a collision could lead to damage to one or both components.

The configuration of the retaining arrangement 18, according to the invention, avoids such damage. If the operating unit 20 collides frontally or even at an angle with an obstacle, then forces are applied to the safety devices 42 and 60. If these forces exceed a predetermined amount or an amount predetermined by the design of the safety devices 42 and 60, then one or the other, or both, of the safety devices 42 and 60 shears off or tears off.

By shearing off, the safety device 42 provided on the hinge leaves 36 of the hinge 32 in the region 38 opposite the pivot axis 34 are no longer held together by it. In this way, it is possible that the part 28 of the support arm 22 facing the operating unit 20 pivots to the rear together with the operating unit 20 due to the force applied by the impact of the collision with the obstacle.

Shearing off the second safety device 60, which connects the claw 46 with the console 52, has the effect that the pin 54 can rotate in the slot 50 as well as slide to the rear and even exit from the slot 50.

A rotation of the pin 54 in the slot 50 and thereby of the operating unit 20 relative to the support arm 22 can occur when the operating implement 12 collides with an obstacle with its side region. In this way, the operating unit 20 can rotate or pivot and evade the obstacle.

Upon a frontal collision of the operating unit 20 with an obstacle, the pin 54 will slide to the rear in the slot, whereby any damage to the operating unit 20 or the support arm 22 or other components is prevented. If the collision is not immediately noticed by the operator and/or the obstacle does not deflect sufficiently, then the pin 54 can exit from the slot 50 whereby the operating unit 20 is freed from the obstacle. Here it is conceivable that the operating unit 20 is released completely from the support arm 22, however, preferably a safety device against this loss is provided, for example, in the form of a chain 62 shown in FIG. 3, that is connected at one end with the operating unit 20 and at the other end with the support arm 22.

In both cases, the operating unit 20 is made operational again after such an incident by the insertion of one or more intact safety devices 42, 60 by an operator.

In order to attain the effect according to the invention, it is also conceivable as in the example shown, that an attachment be provided in the form of a hinge and also in the form of a claw as well as only one of the two types of attachments.

Figure 5:
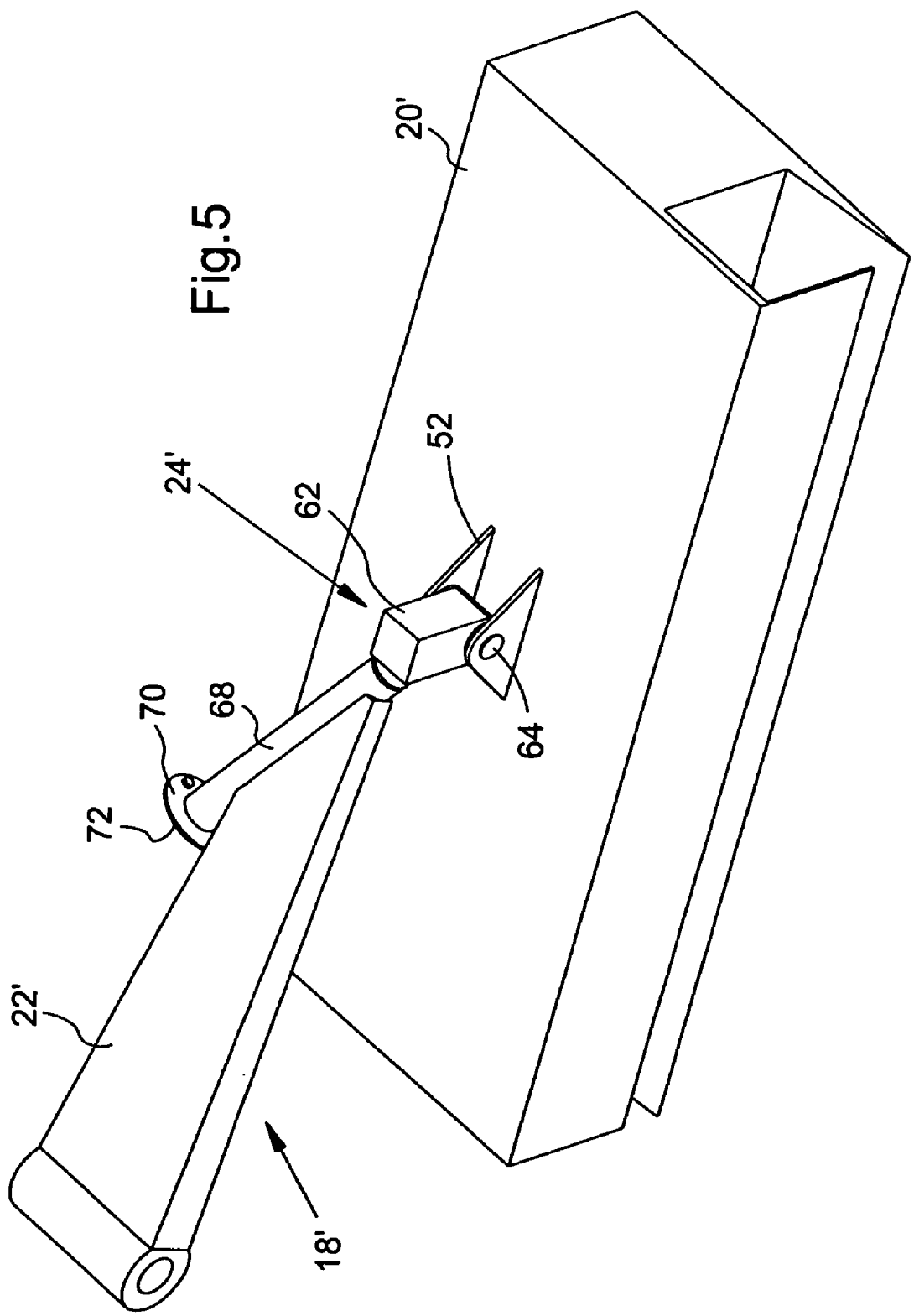
FIG. 5 is a perspective view showing a further embodiment of a retainer arrangement and an operating implement.

The following will now refer to FIG. 5, in which a further embodiment is shown. Components that correspond to those shown in previous embodiments are identified by the same part number call-outs.

Figure 6:
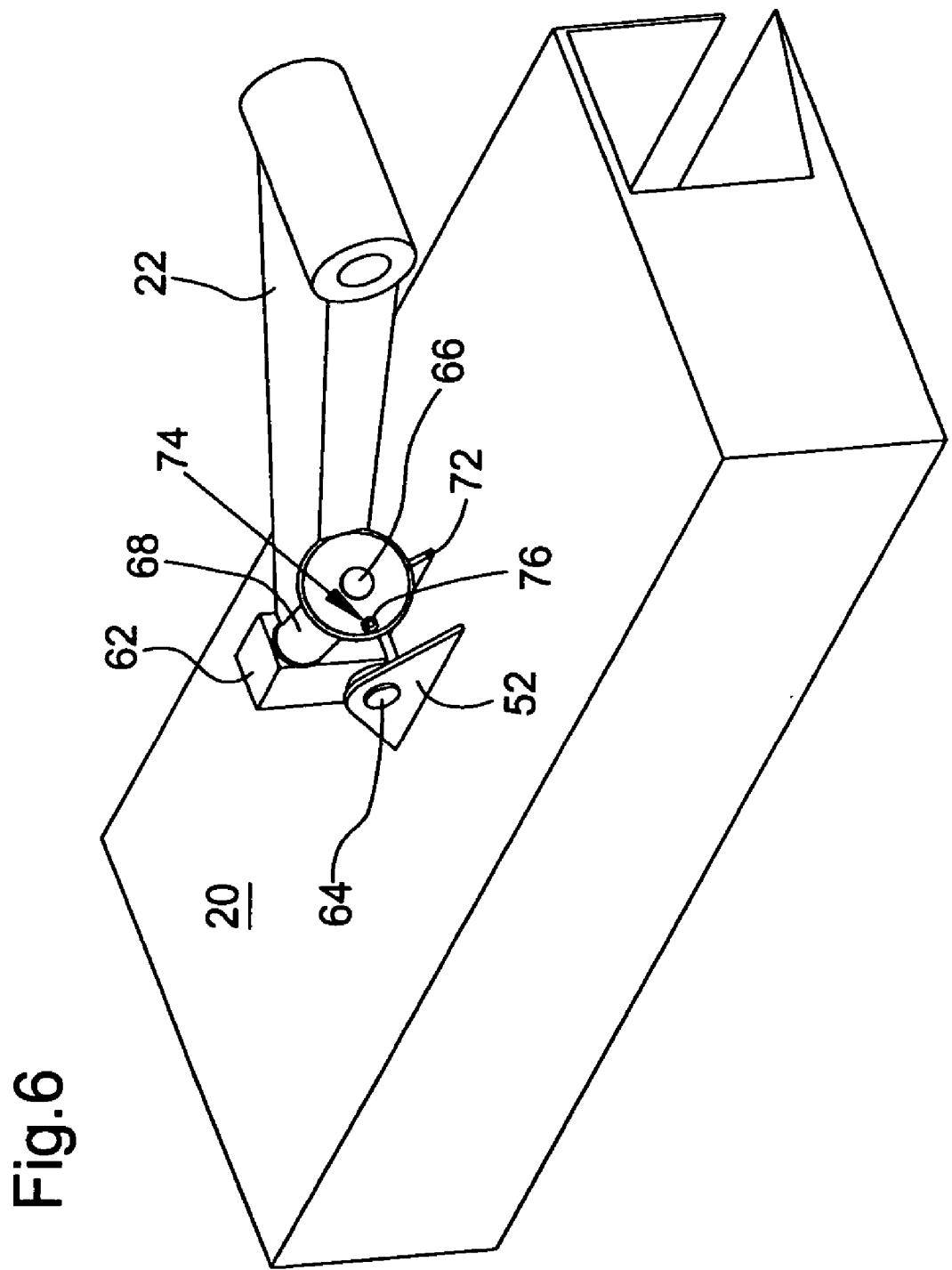
FIG. 6 is a view of the operating implement of FIG. 5 as seen from the front.

An operating unit 20' is shown that can be connected to a vehicle 10 over a retaining arrangement 18'. The operating unit 20' is attached to a support arm 22' by means of a mounting arrangement 24'. The mounting arrangement 24' is provided with a console 52 that is rigidly attached to the operating unit 20' and a housing 62 that is connected with the console 52 in a joint over a pivot pin 64. Referring now also to FIG. 6, it can be seen that an axle pin 66 is fixed to the housing 62. Received for pivoting about the axle pin 66 is a sleeve 68, which is rigidly connected to the support 22'.

Respectively rigidly fixed to the sleeve 68 and the axle pin 66, in their respective regions remote from the operating unit 20, are disks 70 and 72. In both disks 70, 72, bores 74 are provided (shown only as an indication) that are aligned with each other during operation and through which a safety device 76, configured as a shear pin, can be inserted.

As can be seen clearly from FIGS. 5 and 6, the axle pin 66 and therewith a pivot axis of the operating unit 20 is inclined upwardly and outwardly to the rear from the housing 62 during operation.

If the operating unit 20' collides with an obstacle, as was described previously, the resulting forces can lead to a shearing off of the safety device 76. In this way, the connection between the disks 70, 72 is released, thereby permitting the operating unit 20 to pivot relative to the support arm 22 by means of the connection that is now through joints of the axle pin 66 at the sleeve 68.

Since the axle pin 66 and thereby the pivot axis is provided in an inclined orientation, the operating unit 20 can evade the obstacle in the upward direction as well as to the rear and will return to its original position, due to the force of gravity, after it has been freed from the obstacle. As in the case of the other two embodiments, after such an event, only the safety device 76 need be replaced by an operator, in order to make the operating unit 20 fully operational again.

The following will again refer to FIG. 2, through which a further variation of the invention shall be clarified.

A U-shaped contact shackle 78 is mounted on the operating unit 20, so as to pivot vertically, and extends over the entire width of the operating unit 20. The contact shackle 78 is provided in such a way that it will pivot downwardly upon contact with an obstacle or the like located forward of operating unit 20 during operation. When it is not desired to use the shackle 78 control purposes, it may be held in its not actuated position, as shown in FIG. 2, for example, by means of a stop, not shown, which limits any downward movement. When it is in contact with this stop, the contact shackle 78 is retained, for example, by the force of a spring 80 that is shown only as an indication.

For situations where it is desired to use the contact shackle 78 for effecting control affecting operation of the machine 10, the shackle 78 can be permitted to actuate a sensor S that responds by sending an electrical output signal when the contact shackle 78, and therewith the operating unit 20, has collided with an obstacle. The contact shackle 78 can be loaded by the spring 80, or a similar element, in the direction of a non-actuated position.

Such an output signal of the sensor S can be sent to an electrical control unit (ECU) 82, which operates to perform various functions. Provision can be made that an optical indication, at 84, or an acoustic warning signal, at 86, be delivered to an operator as a function of this output so that the operator is notified of the event. However, the sensor S can also deliver its output signal to an electronic control arrangement which deactivates a drive 88 arrangement including the drive of the vehicle 10, or the drive of the particular operating unit 20 that is affected, or even all operating units 20, as a function of this signal.

Beyond that, however, provision can be made for each retaining arrangement 18 to be configured in such a way that the safety devices 42, 60, 76 are each formed by an electrically actuated retaining component arrangement, represented by functional box 90, which may include one or more electrically operated pins or electromagnets, etc., which frees a connection between the operating unit 20 and the support arm 22 upon receiving a signal from the sensor S indicating contact or impending contact with an obstacle.

All these functions can be used individually or in combination.

Having described the preferred embodiment, it will become apparent that various modifications can be made without departing from the scope of the invention as defined in the accompanying claims.

The invention claimed is:

1. In a combination of a retaining arrangement, including a support arm having a first end coupled to a mounting arrangement fixed to a central, top region of an operating unit at a location approximately half way between opposite ends of said operating unit, and a second end adapted for connection to a vehicle, the improvement comprising: said retaining arrangement including a connection defining an upright axis about which said operating unit may pivot; and at least one safety device being associated with said connection for effecting a normal operating condition preventing pivotal movement about said upright axis, as long as a predetermined condition is not fulfilled, but for effecting a released condition permitting pivotal movement of said operating unit about said upright axis in response to said predetermined condition being fulfilled.

2. The combination, as defined in claim 1, wherein said connection includes a friction lock established between said mounting arrangement and said top region of said operating unit; and said upright axis extending centrally through said friction lock.

3. The combination, as defined in claim 2, wherein said at least one safety device is a shear pin coupling said mounting arrangement to said operating unit at a location offset from said upright axis; and said predetermined condition being a load at which said shear pin shears.

4. The combination, as defined in claim 1, wherein said at least one safety device is a power shifted pin device that is responsive to an electrical control signal for moving from an installed position effecting said normal operating condition, and a retracted position permitting said operating unit to pivot about said upright axis; and a control arrangement including a sensor for sensing the presence of an obstacle in a path of movement of said operating unit and for sending said control signal to said power shifted pin device.

5. The combination, as defined in claim 1, wherein said support arm is constructed of two sections connected together by a hinge joint forming a second upright axis about which said operating unit may pivot; and at least a second safety device normally retaining said support arm in a working condition but permitting said operating unit and one of said two sections to pivot about said second upright axis upon a further preset condition being fulfilled.

6. The combination, as defined in claim 1, wherein said connection includes a pin fixed to and projecting upwardly from a top surface of said operating unit along said upright axis; said arm having a plate disposed substantially perpendicular to said axis and having a slot receiving said pin and opening only in a direction opposite from a forward direction of travel of said operating unit; said pin having a head at its upper end dimensioned so as to prevent it from passing axially through said slot; and said safety device normally securing said plate to said top surface of said operating element at a location offset from said upright axis.

7. The combination, as defined in claim 1, wherein said connection includes a member having a cylindrical surface extending along said upright axis; said support arm having an end mounted for pivoting about said cylindrical surface; and said safety device normally preventing said relative movement between said arm and said cylindrical surface.

* * * * *